US012664350B1

(12) United States Patent
Trivedi et al.

(10) Patent No.: US 12,664,350 B1
(45) Date of Patent: Jun. 23, 2026

(54) THIRD-PARTY ADDRESSES FOR EMBEDDED WORKBOOKS

(71) Applicant: SIGMA COMPUTING, INC., San Francisco, CA (US)

(72) Inventors: Zalak H. Trivedi, San Leandro, CA (US); Samuel Andre Abraham Soubeyran, Mountain View, CA (US); James A. Johnson, Concord, CA (US); Ioana Cristina Munteanu, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 303 days.

(21) Appl. No.: 18/636,887

(22) Filed: Apr. 16, 2024

(51) Int. Cl.
*G06F 40/18* (2020.01)
*G06F 16/28* (2019.01)
*G06F 40/106* (2020.01)

(52) U.S. Cl.
CPC .......... *G06F 40/106* (2020.01); *G06F 16/283* (2019.01); *G06F 40/18* (2020.01)

(58) Field of Classification Search
CPC ........................... G06F 3/048–05; G06F 40/18
See application file for complete search history.

(56) References Cited

U.S. PATENT DOCUMENTS

| | | | | |
|---|---|---|---|---|
| 9,881,066 B1 * | 1/2018 | Yousaf | .................. | G06F 3/0482 |
| 11,341,477 B2 * | 5/2022 | Gleason | .................. | H04L 67/02 |
| 12,147,555 B1 * | 11/2024 | Zaharia | .................. | G06F 21/602 |
| 2008/0046803 A1 * | 2/2008 | Beauchamp | .......... | G06F 16/957 |
| | | | | 715/212 |
| 2012/0089902 A1 * | 4/2012 | Sheflin | .................. | H04L 67/02 |
| | | | | 715/234 |
| 2013/0042190 A1 * | 2/2013 | Ciloci | .................. | G06F 3/0488 |
| | | | | 715/764 |
| 2013/0124959 A1 * | 5/2013 | Miyahara | ................ | G06F 40/18 |
| | | | | 715/212 |

* cited by examiner

*Primary Examiner* — Daniel Rodriguez

(57) ABSTRACT

Third-party addresses for embedded workbooks including receiving, by a workbook manager from a third-party user computing system, a request for a network address of a third-party domain including an embedded workbook, wherein the embedded workbook is embedded in the third-party domain and presents data from a cloud-based data warehouse; retrieving, by the workbook manager, a workbook identifier that identifies the embedded workbook, an embed identifier that identifies an embedding element, and a third-party domain identifier that identifies the third-party domain; generating, by the workbook manager, the network address of the third-party domain including the embedded workbook using the workbook identifier, the embed identifier, and the third-party domain identifier; and presenting, by the workbook manager on the third-party user computing system, the generated network address of the embedded workbook.

20 Claims, 6 Drawing Sheets

THIRD-PARTY ADDRESSES FOR EMBEDDED WORKBOOKS

BACKGROUND

Field of the Invention

The field of the invention is data processing, or, more specifically, methods, apparatus, and products for third-party addresses for embedded workbooks.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for third-party addresses for embedded workbooks including receiving, by a workbook manager from a third-party user computing system, a request for a network address of a third-party domain including an embedded workbook, wherein the embedded workbook is embedded in the third-party domain and presents data from a cloud-based data warehouse; retrieving, by the workbook manager, a workbook identifier that identifies the embedded workbook, an embed identifier that identifies an embedding element, and a third-party domain identifier that identifies the third-party domain; generating, by the workbook manager, the network address of the third-party domain including the embedded workbook using the workbook identifier, the embed identifier, and the third-party domain identifier; and presenting, by the workbook manager on the third-party user computing system, the generated network address of the embedded workbook.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
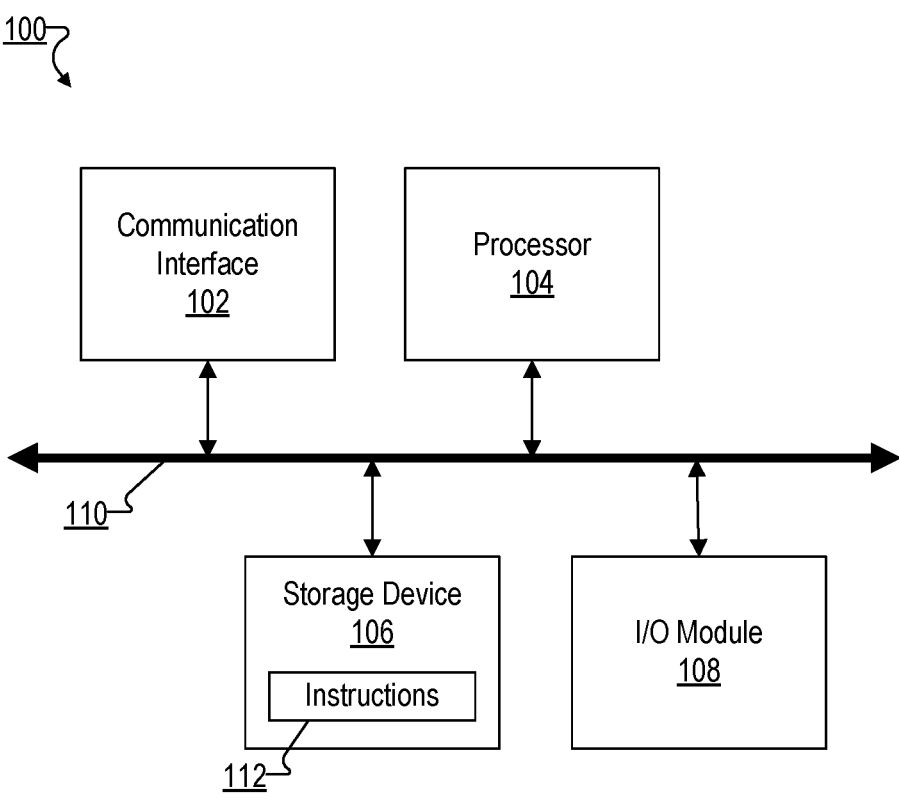
FIG. 1 sets forth a block diagram of an example system configured for third-party addresses for embedded workbooks according to embodiments of the present invention.

Example methods, apparatus, and products for third-party addresses for embedded workbooks in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
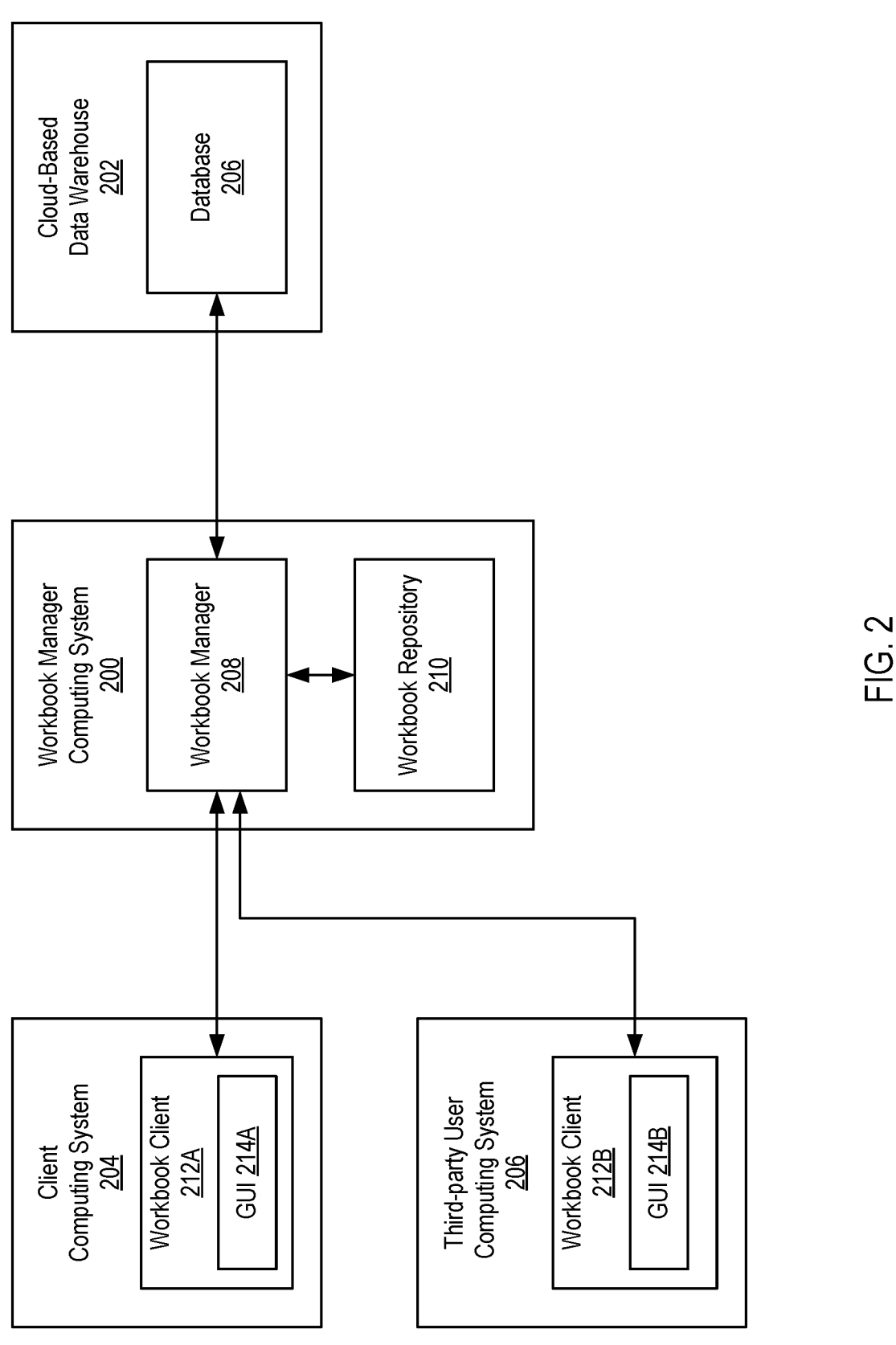
FIG. 2 sets forth a block diagram of an example system configured for third-party addresses for embedded workbooks according to embodiments of the present invention.

For further explanation, FIG. 2 illustrates a block diagram depicting an exemplary system for third-party addresses for embedded workbooks according to embodiments of the present invention. As shown in FIG. 2, the system includes a workbook manager computing system 200, a cloud-based data warehouse 202, a client computing system 204, and a third-party user computing system 206. The workbook manager computing system 200 includes a workbook manager 208 and a workbook repository 210. The client computing system 204 includes a workbook client 212A with a graphical user interface (GUI) 214A. The third-party user computing system 206 also includes a workbook client 212B with a GUI 214B. The cloud-based data warehouse 202 includes a database 204.

The workbook manager 208 is hardware, software, or an aggregation of hardware and software configured to present a dataset within a workbook on a client computing system 204 via the workbook client 212A, 212B. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212a, 212b on the client computing system 204 or third-party computing system 206 for presentation to a user of the client computing system 204 or third-party user. The workbook manager 208 may reside on the workbook manager computing system 200, which is an intermediary computing system between each client computing system, each third-party user computing system, and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212A, 212B is a part of the workbook manager 208 and works in concert with the workbook manager 208 to present a workbook on a client computing system 204. The workbook client 212A, 212B may perform local processing of changes made to the workbook and/or the dataset. The workbook client 212A, 212B may be an application executing within a web browser. The workbook client 212A, 212B may be part of an Internet application that includes the workbook manager 208 and is hosted on the workbook manager computing system 200.

The GUI 214A, 214B is a visual presentation configured to present datasets and workbooks to a client or third-party user. The GUI 214 may present a mechanism by which a user can manipulate and effect change to the workbook in the form of a workbook edit. The GUI 214 may be displayed on client computing system 204 or third-party computing system 206 (e.g., on a system display or mobile touchscreen).

The client computing system 204 is a computing system under the control of a client entity. The client entity is an entity with a direct relationship with the workbook manager 208 such that a client account within the client entity is authorized by the workbook manager 208 to access a workbook. The client entity may be a data tenant of the cloud-based data warehouse and control the dataset underlying the workbook. The third-party user computing system 206 is a computing system under the control of a third-party entity. The third-party entity may have no direct relationship with the workbook manager 208. The third party user accounts may gain access to a workbook or underlying dataset via the client entity.

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
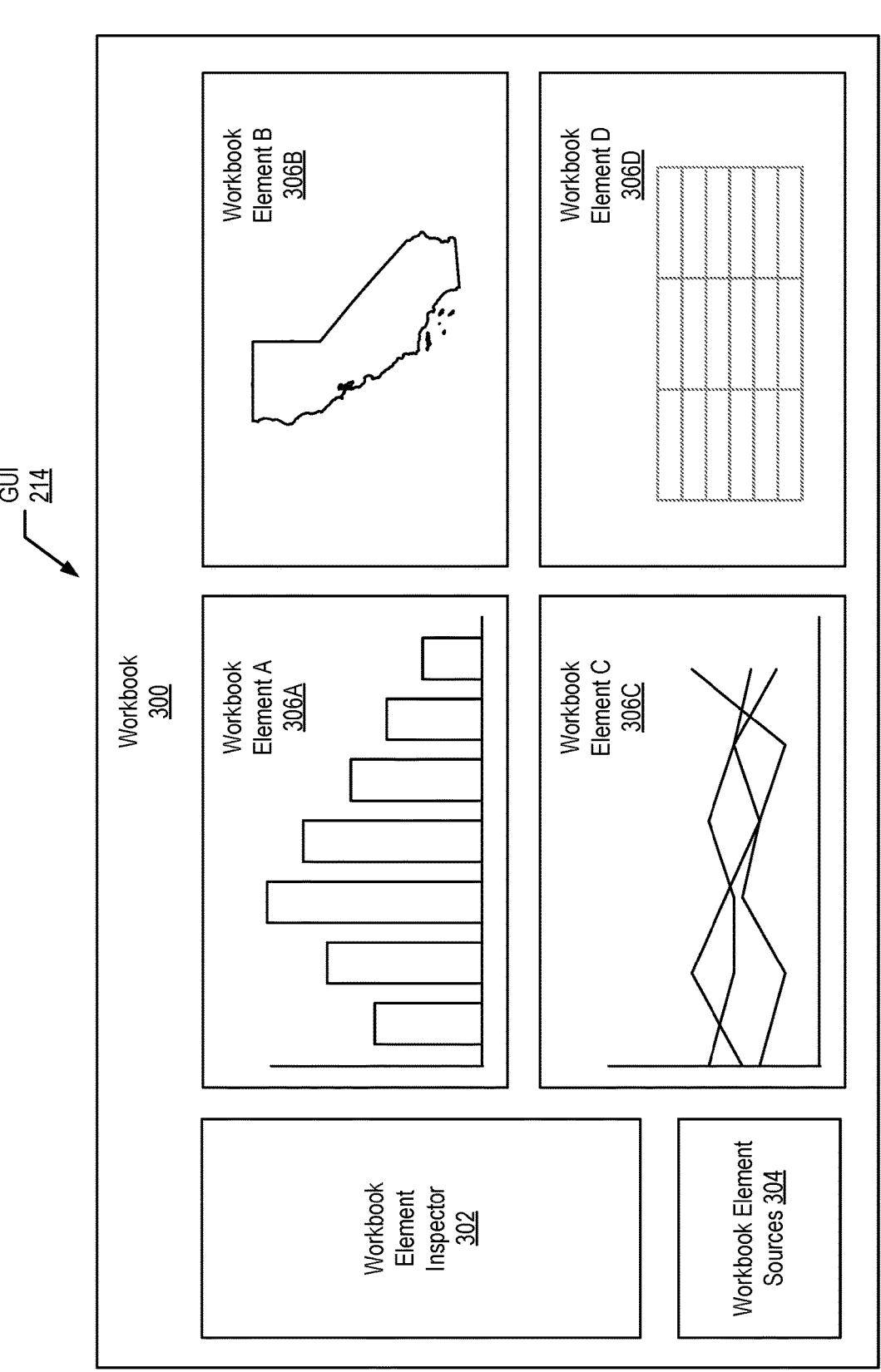
FIG. 3 sets forth a block diagram of an example graphical user interface configured for third-party addresses for embedded workbooks according to embodiments of the present invention.

FIG. 3 shows an exemplary GUI for third-party addresses for embedded workbooks according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
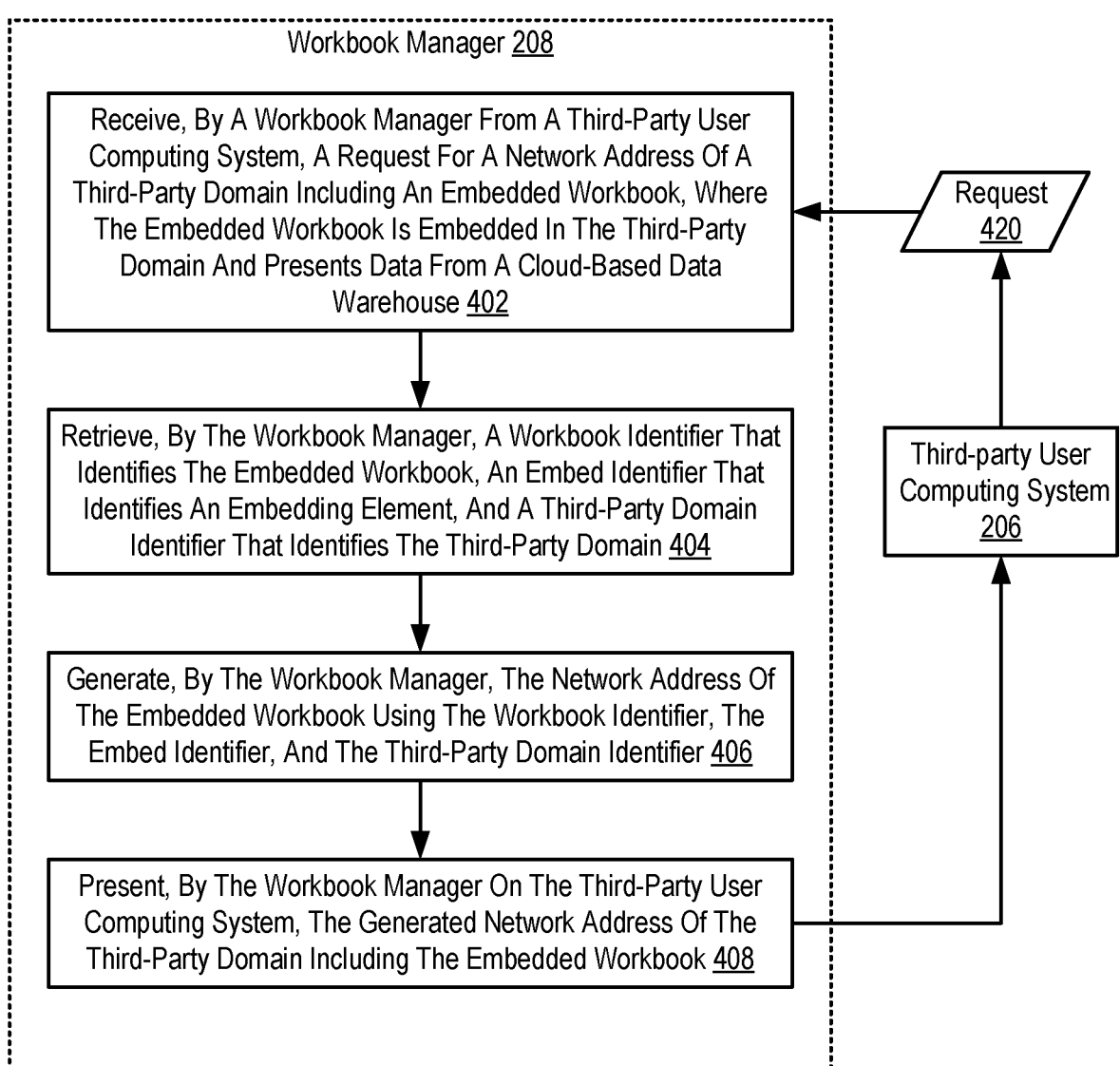
FIG. 4 sets forth a flow chart illustrating an exemplary method for third-party addresses for embedded workbooks according to embodiments of the present invention.

For further explanation, FIG. 4 sets forth a flow chart illustrating an exemplary method for third-party addresses for embedded workbooks according to embodiments of the present invention. When third-party user accounts access a third-party domain with an embedded workbook, the third-party domain may, by default, present the same embedded workbook. To access any other workbook, a third-party user account may be required to request the other workbook via the embedding element. The following method for creating third-party addresses for embedded workbooks allows one user account to generate a network address that can be used to retrieve a particular workbook (or a workbook in a particular state) for embedding within a third-party domain (e.g., within the same third-party domain website used to access the default embedded workbook).

The method of FIG. 4 includes receiving 402, by a workbook manager 208 from a third-party user computing system 206, a request 420 for a network address of a third-party domain including an embedded workbook, wherein the embedded workbook is embedded in the third-party domain and presents data from a cloud-based data warehouse. Receiving 402 a request 420 for a network address of a third-party domain including an embedded workbook may be carried out by the third-party user account using the third-party user computing system 206 to navigate to the third-party domain with a default embedded workbook. The third-party user may then access the desired workbook via the embedding element. With the desired workbook (or workbook configuration) presented within the embedding element, the third-party user may then activate a GUI element that requests, from the workbook manager 208, a network address of the third-party domain that includes the desired embedded workbook.

A third-party domain is a network location hosting websites and other network services under the control of the third-party entity (which also controls the third-party user computing system). The third-party domain may include a webpage or application in which the workbook has been embedded. The workbook may be embedded using the embedding element. The embedding element is a block of code within the website or application that references the workbook on the workbook manager computing system. The embedding element may be an inline frame (i.e., iframe) in an HTML document. The workbook may be created and managed by the client entity (utilizing the workbook manager 208).

A network address of the third-party domain that includes the embedded workbook is a text string describing a network location of the third-party domain (e.g., a website) that includes the embedded workbook. The network address may include multiple components, including a domain name, server name, and a webpage file name. Navigating to the third-party domain with the embedded workbook may result in a default workbook being presented in the embedding element. In order for another workbook or workbook configuration to be presented in the embedding element at the third-party domain location, a network address must be generated with the necessary components to instruct the workbook manager 208 to load the particular workbook or workbook configuration. Such a network address may include a key or other data that is passed to the workbook manager 208 (e.g., via the embedding element) to instruct the workbook manager 208 to load a particular workbook and/or workbook configuration via the embedding element instead of the default workbook.

The method of FIG. 4 also includes retrieving 404, by the workbook manager 208, a workbook identifier that identifies the embedded workbook, an embed identifier that identifies an embedding element, and a third-party domain identifier that identifies the third-party domain. Retrieving 404 a workbook identifier that identifies the embedded workbook, an embed identifier that identifies an embedding element, and a third-party domain identifier that identifies the third-party domain may be carried out by the workbook manager 208 accessing metadata for the presented workbook and using the metadata to generate the workbook identifier that references the embedded workbook.

The embed identifier identifies the particular embedding element within the third-party domain in which the workbook is presented. Retrieving the embed identifier may include inspecting the presented third-party domain webpage to obtain a unique identifier of the embed element. The third-party domain identifier identifies the location within a network or within an application in which the currently presented workbook is embedded. Retrieving the third-party domain identifier may include inspecting the website or application for the relative location of the embedded workbook or issuing a request to the server for the network location.

The third-party user account may intend to create a network address that points to a different workbook than the default workbook and/or a particular workbook configuration of a particular workbook. A workbook configuration is a state of a workbook. A workbook configuration of a workbook may present a particular page of the workbook upon retrieval (instead of the first page) or include adjustments made from the default presentation (such as an option selected that changes a visualization).

The method of FIG. 4 also includes generating 406, by the workbook manager 208, the network address of the third-party domain including the embedded workbook using the workbook identifier, the embed identifier, and the third-party domain identifier. Generating 406 the network address of the third-party domain including the embedded workbook using the workbook identifier, the embed identifier, and the third-party domain identifier may be carried out by combining the workbook identifier, the embed identifier, and the third-party domain identifier into a single network location text string. Alternatively, the workbook identifier, the embed identifier, and the third-party domain identifier may be modified before being added to the network address.

The method of FIG. 4 also includes presenting 408, by the workbook manager 208 on the third-party user computing system 206, the generated network address of the third-party domain including the embedded workbook. Presenting 408 the generated network address of the third-party domain including the embedded workbook may be carried out by displaying a text box containing the text of the network address, allowing the third-party user account to copy or transmit the network address to another third-party user account. The network address may be presented in a GUI window overlayed on the presented workbook.

As an example of the above, assume the webpage "www-.steakbistro.com/internal/resmanager.html" directs employees of the restaurant Steak Bistro (i.e., the third-party entity) to a webpage managed by Steak Bistro that includes an embedded workbook managed by an outside reservation management system named "Rez" (i.e., the client entity). A host working for Steak Bistro accesses the webpage to review the reservations for the upcoming week. Upon accessing the webpage, the host is presented with a workbook that includes a spreadsheet structure workbook element with the current day's reservations. The host interacts with the workbook to navigate to the reservations for the upcoming Saturday and notices an issue with capacity that the host would like to share with the manager. Instead of instructing the manager to access the webpage and, within the embedded workbook, navigate away from the default presentation of the workbook, the host requests a network address that includes the current presentation of the workbook. The workbook manager then retrieves the workbook identifier ("reservations"), the embed identifier (identifier of the iframe within the webpage), and the third-party domain identifier ("steakbistro.com/internal/resmanager.html"). The workbook manager then generates a network address that directs a third-party user account to the webpage www-.steakbistro.com/internal/resmanager.html and loads, in the iframe of the webpage, the workbook presenting the reservations for the upcoming Saturday. The full network address may be, for example, www.steakbistro.com/internal/resmanager.html-iframe . . . reservations/mar30-2024. The workbook manager then presents the network address to the host, who then copies and pastes the network address in an email to the manager.

The above steps improve the operation of the computer system by allowing a third-party user account to share a network address with another third-party user account that presents a third-party domain with particular workbook or workbook configuration embedded therein. This is accomplished by the workbook manager gathering a workbook identifier, an embed identifier, and a third-party domain identifier, and generating the network address.

Figure 5:
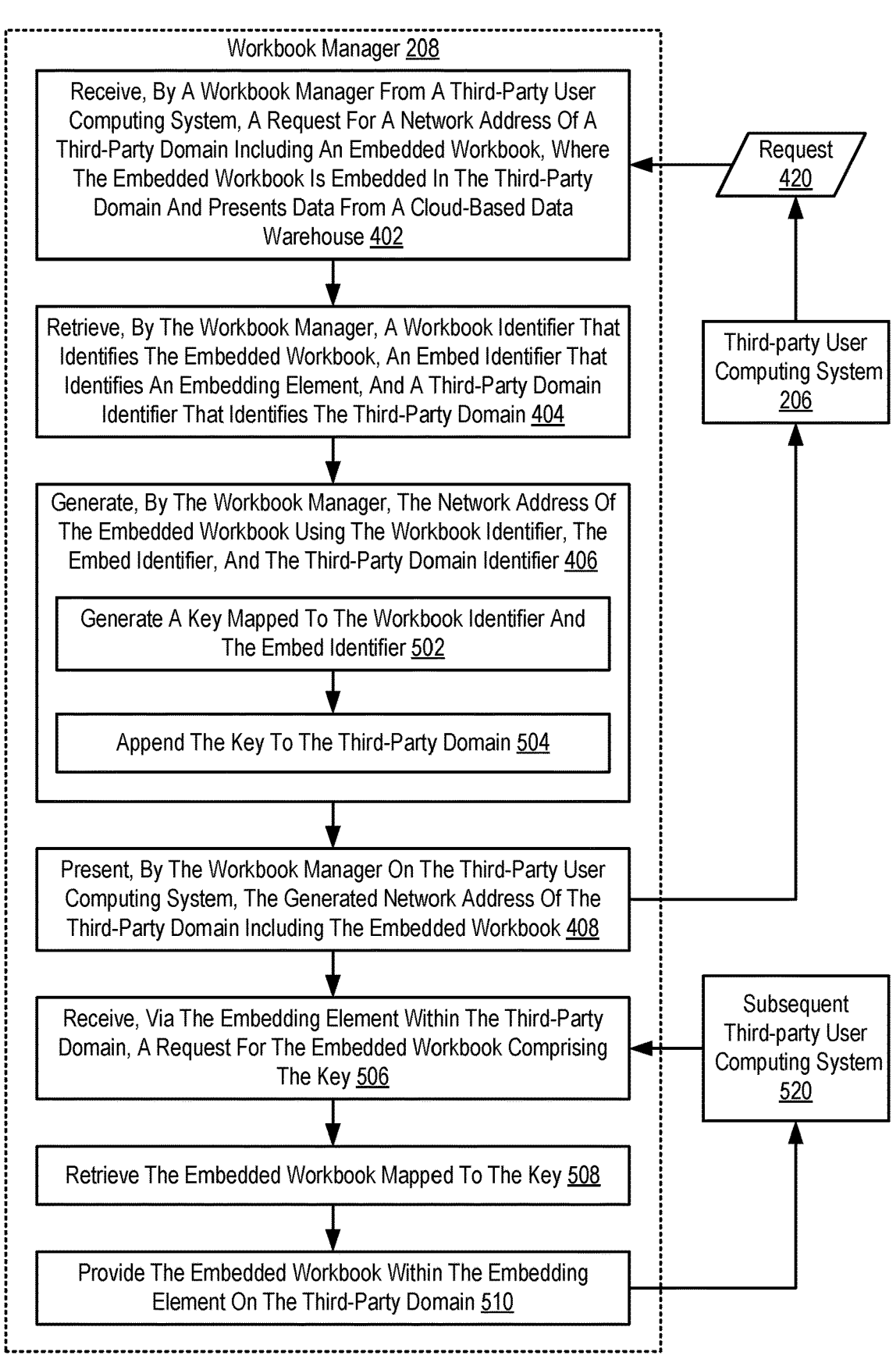
FIG. 5 sets forth a flow chart illustrating an exemplary method for third-party addresses for embedded workbooks according to embodiments of the present invention.

For further explanation, FIG. 5 sets forth a flow chart illustrating a further exemplary method for third-party addresses for embedded workbooks according to embodiments of the present invention that includes receiving 402, by a workbook manager 208 from a third-party user computing system 206, a request 420 for a network address of a third-party domain including an embedded workbook, wherein the embedded workbook is embedded in the third-party domain and presents data from a cloud-based data warehouse; retrieving 404, by the workbook manager 208, a workbook identifier that identifies the embedded workbook, an embed identifier that identifies an embedding element, and a third-party domain identifier that identifies the third-party domain; generating 406, by the workbook manager 208, the network address of the third-party domain including the embedded workbook using the workbook identifier, the embed identifier, and the third-party domain identifier; and presenting 408, by the workbook manager 208 on the third-party user computing system 206, the generated network address of the third-party domain including the embedded workbook.

The method of FIG. 5 differs from the method of FIG. 4, however, in that generating 406, by the workbook manager 208, the network address of the third-party domain including the embedded workbook using the workbook identifier, the embed identifier, and the third-party domain identifier includes generating 502 a key mapped to the workbook identifier and the embed identifier; and appending 504 the key to the third-party domain.

Generating 502 a key mapped to the workbook identifier and the embed identifier may be carried out by the workbook manager 208 creating a unique text string and storing that text string to a data structure. Within the data structure, the workbook manager 208 may map the text string to the necessary information to retrieve the particular workbook or workbook configuration. For example, the text string may be mapped to the workbook identifier, the embed identifier, and the third-party domain identifier. Appending 504 the key to the third-party domain may be carried out by attaching the key to the third-party domain in manner such that the key is passed to the workbook manager upon accessing the third-party domain via the network address.

The method of FIG. 5 also differs from the method of FIG. 4, however, in that the method of FIG. 5 further includes receiving 506, via the embedding element within the third-party domain, a request for the embedded workbook comprising the key; retrieving 506 the embedded workbook mapped to the key; and providing 508 the embedded workbook within the embedding element on the third-party domain.

Receiving 506, via the embedding element within the third-party domain, a request for the embedded workbook comprising the key may be carried out by the workbook manager 208 detecting a request for a workbook that includes a key. The request for the embedded workbook may be associated with a subsequent third-party user account (using a subsequent third-party user computing system 520). Specifically, the request may have originated from the subsequent third-party user account separate from the third-party user account that generated the network address. The request for the embedded workbook that includes the key may be received as part of the third-party user account using the network address to access the third-party domain. In loading the embedding element portion of the third-party domain location the request including the key is transmitted to the workbook manager 208.

Retrieving 506 the embedded workbook mapped to the key may be carried out by retrieving the data mapped to the key using the data structure. The data mapped to the key may include the workbook identifier, the embed identifier, and the third-party domain identifier. The workbook manager 208 may then retrieve the workbook associated with the workbook identifier from the workbook repository. Providing 508 the embedded workbook within the embedding element on the third-party domain may be carried out by the workbook manager 208 transmitting the retrieved workbook to the subsequent third-party user computing system and targeting the embedding element identified by the embed identifier.

Providing 508 the embedded workbook within the embedding element on the third-party domain may also include providing the embedded workbook comprises determining that the third-party user account is authorized to accesses the embedded workbook. Specifically, the workbook manager 208 may retrieve permissions associated with the subsequent third-party user account and with the requested embedded workbook (such as workbook parameters). If the permissions for the subsequent third-party user account allow the user account to access the requested embedded workbook, then the embedded workbook is provided to the subsequent third-party user account on the subsequent third-party user computing system 520. If the permissions for the subsequent third-party user account do not allow the user account to access the requested embedded workbook, then the request is denied and an error is sent to the subsequent third-party user computer system 520.

Figure 6:
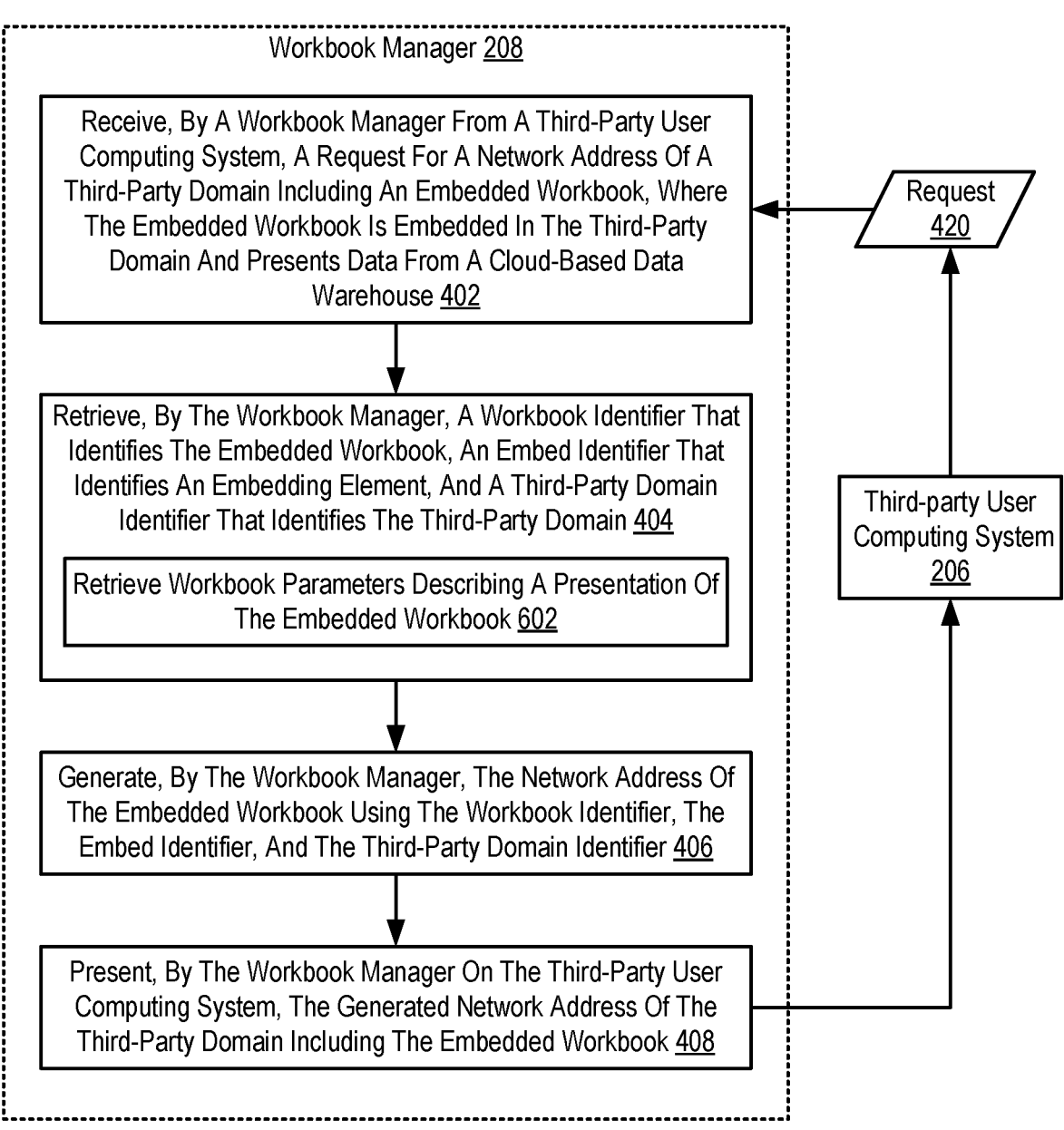
FIG. 6 sets forth a flow chart illustrating an exemplary method for third-party addresses for embedded workbooks according to embodiments of the present invention.

For further explanation, FIG. 6 sets forth a flow chart illustrating a further exemplary method for [PREAMBLE] according to embodiments of the present invention that includes receiving 402, by a workbook manager 208 from a third-party user computing system 206, a request 420 for a network address of a third-party domain including an embedded workbook, wherein the embedded workbook is embedded in the third-party domain and presents data from a cloud-based data warehouse; retrieving 404, by the workbook manager 208, a workbook identifier that identifies the embedded workbook, an embed identifier that identifies an embedding element, and a third-party domain identifier that identifies the third-party domain; generating 406, by the workbook manager 208, the network address of the third-party domain including the embedded workbook using the workbook identifier, the embed identifier, and the third-party domain identifier; and presenting 408, by the workbook manager 208 on the third-party user computing system 206, the generated network address of the embedded workbook.

The method of FIG. 6 differs from the method of FIG. 4, however, in that retrieving 404, by the workbook manager 208, a workbook identifier that identifies the embedded workbook, an embed identifier that identifies an embedding element, and a third-party domain identifier that identifies the third-party domain includes retrieving 602 workbook parameters describing a presentation of the embedded workbook. Retrieving 602 workbook parameters describing a presentation of the embedded workbook may be carried out by the workbook manager 208 accessing the data structure storing the workbook identifier, the embed identifier, and the third-party domain identifier, and retrieving the workbook parameters.

The workbook parameters may include an identifier of a third-party user account or a third-party team that created the workbook or generated the network address. A third-party user account is a user account under the control of a third-party entity that may also control the third-party domain. A third-party team is a group of third-party user accounts that are managed collectively. The workbook parameter identifying the third-party user account or third-party team may be used to determine permissions for the workbook.

The workbook parameters may include an identifier of a theme. A theme is the combination of colors and configuration of the workbook. The theme may be instituted to match the website into which the workbook is embedded. For example, the workbook may have a blue color theme in one third-party website but have a red color theme in another third-party website. The workbook parameter identifying the theme may be used to configure the workbook for presentation.

The workbook parameters may include an identifier of a version. A version refers to a particular saved copy of the workbook. For example, a workbook may have a production version and a development version. The workbook parameter identifying version may be used to retrieve a particular version of the requested workbook.

In view of the explanations set forth above, readers will recognize that the benefits of third-party addresses for embedded workbooks according to embodiments of the present invention include:

Improving the operation of the computer system by allowing a third-party user account to share a network address with another third-party user account that presents a third-party domain with particular workbook or workbook configuration embedded therein.

Exemplary embodiments of the present invention are described largely in the context of a fully functional computer system for third-party addresses for embedded workbooks. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
receiving, by a workbook manager from a third-party user computing system, a request for a network address of a third-party domain including an embedded workbook, wherein the embedded workbook is embedded in the third-party domain and presents data from a cloud-based data warehouse;
retrieving, by the workbook manager, a workbook identifier that identifies the embedded workbook, an embed identifier that identifies an embedding element, and a third-party domain identifier that identifies the third-party domain;

14 generating, by the workbook manager, the network address of the third-party domain including the embedded workbook using the workbook identifier, the embed identifier, and the third-party domain identifier; and
presenting, by the workbook manager on the third-party user computing system, the generated network address of the embedded workbook.

2. The method of claim 1, wherein generating the network address of the third-party domain including the embedded workbook using the workbook identifier, the embed identifier, and the third-party domain identifier comprises:
generating a key mapped to the workbook identifier and the embed identifier; and
appending the key to the third-party domain.

3. The method of claim 2, further comprising:
receiving, via the embedding element within the third-party domain, a request for the embedded workbook comprising the key;
retrieving the embedded workbook mapped to the key; and
providing the embedded workbook within the embedding element on the third-party domain.

4. The method of claim 3,
wherein the request for the embedded workbook is associated with a third-party user account, and
wherein providing the embedded workbook comprises determining that the third-party user account is authorized to accesses the embedded workbook.

5. The method of claim 1, wherein retrieving the workbook identifier comprises retrieving workbook parameters describing a presentation of the embedded workbook.

6. The method of claim 5, wherein the workbook parameters include at least one selected from a group consisting of a third-party user identifier, a third-party team identifier, a theme identifier, and a version identifier.

7. The method of claim 1, wherein the network address comprises a domain name of the third-party domain.

8. The method of claim 1, wherein the workbook is embedded in an inline frame of a webpage within the third-party domain.

9. The method of claim 1, wherein the data from the cloud-based data warehouse is under the control of a data tenant separate from a third-party entity controlling the third-party domain.

10. The method of claim 1, wherein the workbook is hosted on the workbook manager.

11. A system comprising:
a memory; and
a processing device, operatively coupled to the memory, the processing device configured to:
receive, from a third-party user computing system, a request for a network address of a third-party domain including an embedded workbook, wherein the embedded workbook is embedded in the third-party domain and presents data from a cloud-based data warehouse;
retrieve a workbook identifier that identifies the embedded workbook, an embed identifier that identifies an embedding element, and a third-party domain identifier that identifies the third-party domain;
generate the network address of the third-party domain including the embedded workbook using the workbook identifier, the embed identifier, and the third-party domain identifier; and present, on the third-party user computing system, the generated network address of the embedded workbook.

12. The system of claim 11, wherein generating the network address of the third-party domain including the embedded workbook using the workbook identifier, the embed identifier, and the third-party domain identifier comprises:

generating a key mapped to the workbook identifier and the embed identifier; and appending the key to the third-party domain.

13. The system of claim 12, wherein the processing device is further configured to:

receiving, via the embedding element within the third-party domain, a request for the embedded workbook comprising the key;

retrieving the embedded workbook mapped to the key; and providing the embedded workbook within the embedding element on the third-party domain.

14. The system of claim 13, wherein the request for the embedded workbook is associated with a third-party user account, and wherein providing the embedded workbook comprises determining that the third-party user account is authorized to accesses the embedded workbook.

15. The system of claim 11, wherein retrieving the workbook identifier comprises retrieving workbook parameters describing a presentation of the embedded workbook.

16. The system of claim 15, wherein the workbook parameters include at least one selected from a group consisting of a third-party user identifier, a third-party team identifier, a theme identifier, and a version identifier.

17. The system of claim 11, wherein the network address comprises a domain name of the third-party domain.

18. The system of claim 11, wherein the workbook is embedded in an inline frame of a webpage within the third-party domain.

19. The system of claim 11, wherein the data from the cloud-based data warehouse is under the control of a data tenant separate from a third-party entity controlling the third-party domain.

20. A non-transitory computer readable storage medium storing instructions which, when executed, cause a processing device to:

receive, from a third-party user computing system, a request for a network address of a third-party domain including an embedded workbook, wherein the embedded workbook is embedded in the third-party domain and presents data from a cloud-based data warehouse;

retrieve a workbook identifier that identifies the embedded workbook, an embed identifier that identifies an embedding element, and a third-party domain identifier that identifies the third-party domain;

generate the network address of the third-party domain including the embedded workbook using the workbook identifier, the embed identifier, and the third-party domain identifier; and present, on the third-party user computing system, the generated network address of the embedded workbook.

\* \* \* \* \*